(No Model.)
G. D. HUSEMANN & E. A. SAID.
PULLEY.
No. 269,419. Patented Dec. 19, 1882.
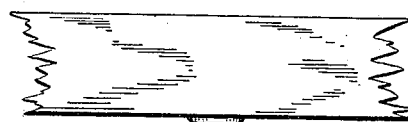
Fig. 1.
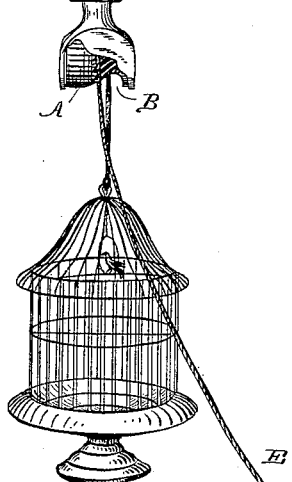
Fig. 2.
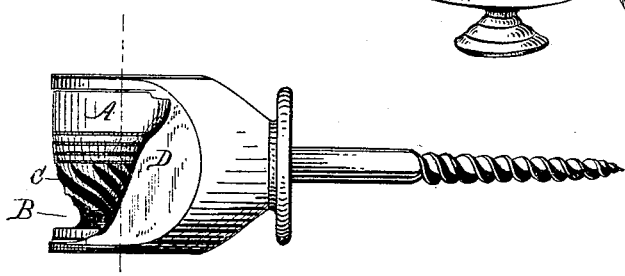
Fig. 3.
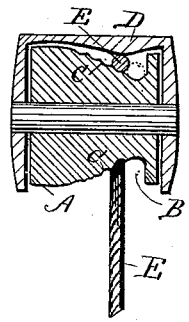
WITNESSES:
Thos Houghton
A. G. Syme
INVENTORS:
G. D. Husemann
E. A. Said
BY
ATTORNEYS.

UNITED STATES PATENT OFFICE.

GOTTLIEB D. HUSEMANN AND EMERY A. SAID, OF ST. LOUIS, MISSOURI.

PULLEY.

SPECIFICATION forming part of Letters Patent No. 269,419, dated December 19, 1882.

Application filed June 14, 1882. (No model.)

*To all whom it may concern:*

Be it known that we, GOTTLIEB DIETRICH HUSEMANN and EMERY ALPHONSO SAID, of the city of St. Louis, in the State of Missouri, have invented a new and useful Improvement in Pulleys, of which the following is a full, clear, and exact description, reference being had to the annexed drawings, forming part of this specification.

This invention relates to pulleys for raising and lowering window-shades, mosquito-bars, bird-cages, and other objects; and the invention consists of a pulley so constructed that it shall act as a brake, in connection with its block, to hold the cord at any desired point, as hereinafter described.

In the drawings, Figure 1 is a general view, showing the application of our invention. Fig. 2 is an enlarged view of the pulley, and Fig. 3 is an axial section of the same.

The pulley A is constructed with a groove, B, near one end, instead of at the center, and the wall of the groove on the side adjacent to the center is made to slope away gradually to any desired extent, while the opposite wall is more or less radial, as in ordinary pulleys. The sloping wall of the groove, as indicated at C, is provided with small spiral serrations or grooves, branching off laterally from the bottom of groove B in a uniform manner, for throwing the cord to one side out of the groove B—its normal position—when the pulley is turned in a given direction. To aid in this object, the pulley-block, in which the pulley is journaled, is provided with a flange, D, which overlies the groove B and the said sloping wall thereof in such manner that when the serrations throw the cord E to one side it will be wedged between the sloping wall and the flange, and thus brought to a stop instantly. As soon as the cord is drawn in the opposite direction, the serrations will cause it to become disengaged from its wedged position and the pulley will be allowed to rotate freely until its movement is again reversed by the weight of the object being lifted, when the tension of the operating-cord is relaxed.

With this construction the pulley is rendered automatic in its operation—that is, the cord can be made fast at any desired point by simply removing the hand therefrom, the weight of the object being lifted being sufficient to wedge or bind the cord between the sloping wall and the flange as soon as the movement of the pulley is reversed and the serrations act upon the cord.

Having thus described our invention, what we claim, and desire to secure by Letters Patent, is—

The combination of the pulley having its groove provided with a sloping serrated wall on one side, the pulley-block having a flange overlying the groove and its sloping wall, and the cord arranged in the groove, substantially as shown and described, whereby a brake shall be provided to arrest and hold the cord at any desired point, as set forth.

GOTTLIEB DIETRICH HUSEMANN.
EMERY ALPHONSO SAID.

Witnesses:
AUGUST SAUERWEIN,
HENRY W. BRADLEY.